March 13, 1945.  M. O. SCHUR  2,371,266
SURFACE SIZED PAPER PRODUCT
Filed June 26, 1942  4 Sheets-Sheet 1

INVENTOR.
Milton O. Schur
BY
ATTORNEYS

Patented Mar. 13, 1945

2,371,266

UNITED STATES PATENT OFFICE 2,371,266

SURFACE SIZED PAPER PRODUCT

Milton O. Schur, Berlin, N. H., assignor, by mesne assignments, to Reconstruction Finance Corporation, Washington, D. C., a corporation of the United States Application June 26, 1942, Serial No. 448,543

1 Claim. (Cl. 117—86)

This invention relates to improvements in the art of coated paper and pulp products, and paper and pulp products especially prepared for coating purposes.

There are numerous film-forming materials for coating paper and paper products, for example, adhesive or gumming coatings, water-resistant, water-repellant and waterproofing coatings, grease-resistant coatings, etc. Among the adhesive or gumming coatings there may be mentioned animal glue. Examples of water-resistant, water-repellant or waterproofing coatings are cellulose esters, cellulose ethers, natural and synthetic rubber and rubber-like substances, as for example rubber hydrochloride and chlorinated rubber, natural and synthetic resins, waxes and bitumens, e. g., paraffin wax, asphalt, and various polymers of a resinous, plastic or rubber-like nature, as for example linear polyamide polymers, polymerized isobutylene, polymerized esters of acrylic acid and methacrylic acid, polymers and copolmers of vinyl chloride and vinyl acetate, polymers and copolymers of butadiene and derivatives thereof, etc.

As examples of grease-resistant coatings, zein and other prolamines may be mentioned.

The art of coating paper employs, therefore, in general, film-forming substances, and the present invention is directed to an improvement in the use of film-forming substances in general as coatings for paper and pulp products. Such film-forming substances are not limited to organic substances since inorganic film-forming substances may also be employed, as for example silicates and various flexibilized compositions thereof.

In this art the problem has arisen of confining the coating substantially to the surface of the paper or paper product and avoiding impregnation or undesired penetration of the coating into the body of the cellulose material. Such impregnation or penetration is uneconomical for the purposes desired and in some cases, at least, is further undesirable because it is desired to maintain the normal or inherent characteristics of the base to be coated without impairing those characteristics. The problem may be specifically illustrated by reference to the manufacture of gummed paper. Such paper is normally made from kraft paper stock of wrapping paper type provided on one side with an adhesive coating of animal glue. Unless specially treated, the paper absorbs so much glue that the consumption thereof is large and, furthermore, the penetration of the glue is so great that the normal tear-resisting and flex-enduring properties of the paper tend to be impaired. The penetration of the glue can be reduced by subjecting the paper stock to a high degree of hydration in the beater, and while this expedient produces a web of sufficient density to decrease penetration in the subsequent treatment with a glue coating composition, the hydration detracts from the mechanical properties of the paper including flex-endurance and tear-resistance. Instead of or in addition to extensive hydration, the web may be heavily impregnated with various sizing materials, as for example starch, but here again the price paid for reducing the absorptiveness of the paper is an impairment of the desired tear-resisting and flex-enduring qualities of the paper.

The problem has therefore arisen of discovering a composition which when used in a very small proportion in relation to a paper which is normally flexure-durable and tear-resistant will act so efficiently as a surface priming agent that it will, without seriously impairing the desired mechanical properties of the paper, serve to confine the film-forming coating material to the surface thereof.

Solution of this problem means not only that much smaller proportions of coating material may be employed to create the necessary superimposed film, but also that this economical advantage is attained without seriously sacrificing the desired mechanical properties of the coated paper. Many of the coatings mentioned are very expensive in relation to the paper and can be economically employed on a porous base only when the coating is confined to the surface. Moreover, the porosity or open texture of the base is, as in the case of normal kraft paper stock, associated with the well known flex-enduring and tear-resisting properties of such stock. The problem, therefore, is to preserve the inherent characteristic coarse structure of the paper while at the same time applying the desired coating.

It is therefore an object of the present invention to solve this problem and therefore to provide a surface primer for paper which in very small proportions acts effectively to confine coatings of film-forming materials to the surface of the primed paper.

Although the problem arose in connection with the coating of papers possessing flex-enduring and tear-resisting properties, and although one of the advantages of the invention is the provision of means to confine coatings of film-forming materials effectively to the surface thereof without seriously impairing the said flex-enduring and tear-resisting properties, nevertheless, having solved that particular problem it has been found that the invention is capable of application to other pulp products and may, in general, be applied as an improved surface priming means to pulp products, particularly in those cases where the pulp body is inherently of a relatively coarse structure and it is desired to preserve that structure while providing it with an effective and economical surface coating of a film-forming material.

The present invention involves the discovery that combinations of bentonite and cooked starch, particularly those in which the ratio of bentonite and starch is held within certain limits, can be employed as a highly effective surface size or primer in such small proportions by weight in relation to the weight of the paper stock to be treated and to the effectiveness of the sizing that the normal flex-enduring and tear-resisting properties of that stock are not seriously impaired.

In general, it has been found that proportions of starch-bentonite composition of about 0.5 percent to 5.0 percent by weight of the paper stock treated are sufficient to effect the desired tight sizing and that within this range a very effective sizing is obtained without seriously impairing the desired qualities of the paper stock which may, for example, be kraft paper stock of wrapping paper type. Preferably the proportion by weight of bentonite to the total weight of the starch plus bentonite is limited within the range of about 20 to 80 percent, as it has been discovered that the sizing properties of composition within this range are particularly effective.

A convenient form of the bentonite-starch composition for application to the paper is a dilute aqueous suspension of cooked starch and bentonite, the concentration of the solids in this suspension being sufficient to deposit the quantity of starch and bentonite desired in the final paper in those cases where the paper is passed through the aqueous suspension, as for example in a size-tub, and then passed through squeeze rolls. The sheet of paper may be run continuously from a roll accumulation or from the dry end of a paper-making machine through a size-press or tub containing the sizing composition in aqueous suspension. The sized sheet issuing from the size-tub may be dried on the usual steam-heated drier drums.

There are two convenient tests which may be employed quantitatively as a measure of the surface-priming effectiveness of the composition. One of these is the oil penetration test which may be described briefly as follows: One inch square specimens of the treated paper product are floated on the surface of lubricating oil of S. A. E. viscosity 30 and the time in seconds required for the oil to penetrate through the specimens over about 90 percent of the surface thereof is noted.

Another test is the Gurley Densometer test which measures the porosity in terms of the time in seconds required for 100 cc. of air to pass through a selected area of the paper.

The tests referred to are standard in the paper industry and no further details are required.

The unique sizing or sealing effect of starch-bentonite composition according to the present invention will be made plain by reference to the accompanying drawing, in which.

Figure 1:
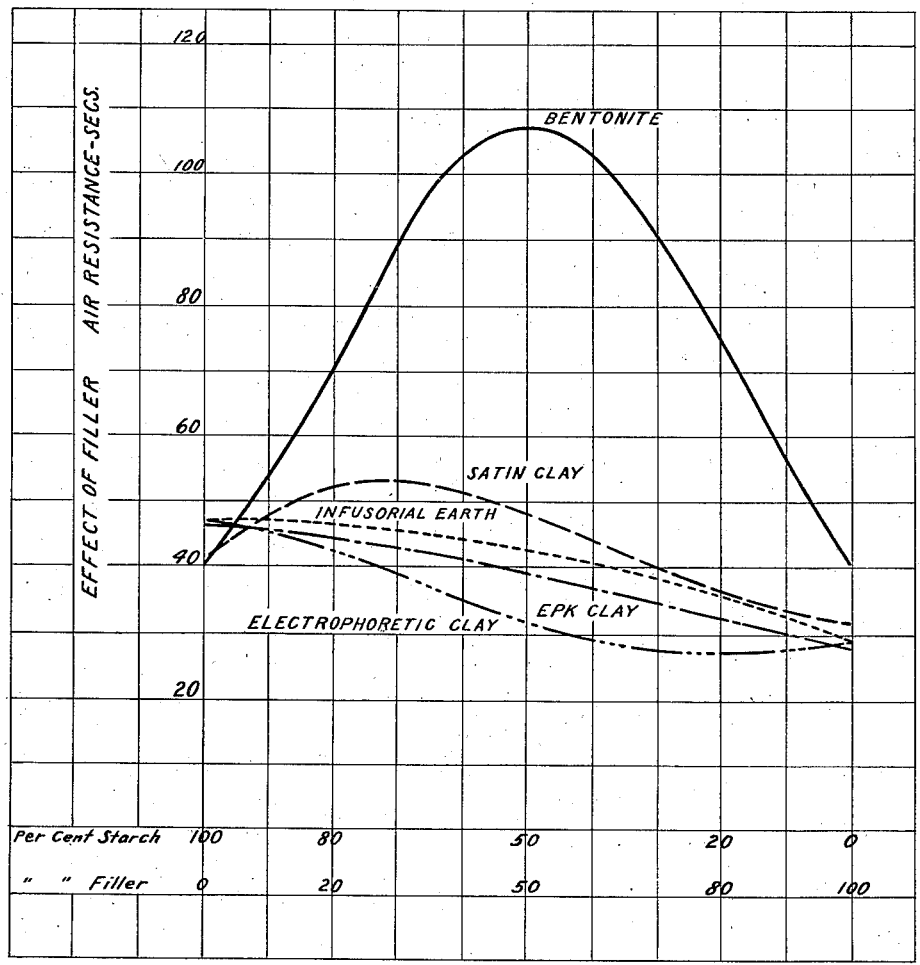
Fig. 1 shows the sealing effect of combinations of starch with bentonite in relation to other so-called fillers in terms of the Gurley Densometer test.
Figure 2:
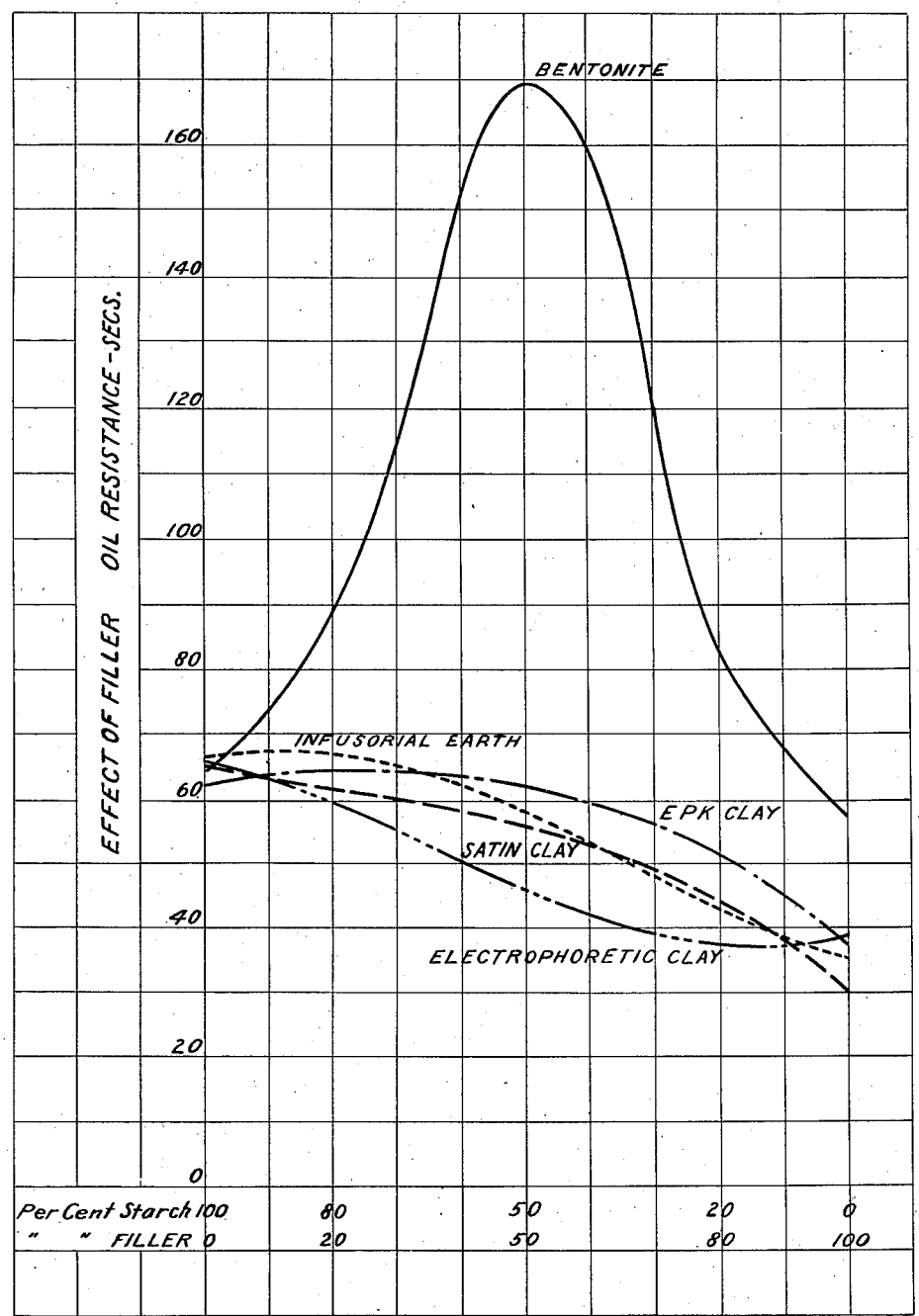
Fig. 2 shows the same effect in terms of the oil penetration test.

Reference to these figures will show that there is a unique relationship between starch and bentonite. In Figs. 1 and 2 the starch component of the composition is the same (tapioca starch being specifically used in the tests shown in these figures) and the filler is varied, the so-called fillers used being bentonite, satin clay, infusorial earth, "EPK" clay (a commercial product sold under this trade name. The clay is of very fine particle size and is recommended for use in making pottery) and electrophoretic clay (a special clay made electrophoretically, with very fine particle size).

The ordinates in Fig. 1 are the Gurley values, that is, the time in seconds required for 100 cc. of air to pass through a predetermined area of the sized paper. The ordinates in Fig. 2 are the oil penetration values. The abscissae in both Figs. 1 and 2 show the ratio between the starch and the filler. It is clear from Figs. 1 and 2 that the relationship between starch and bentonite is uniquely different than that between starch and the other fillers, in respect of the effect of the starch-bentonite composition as a sealing composition.

Figure 3:
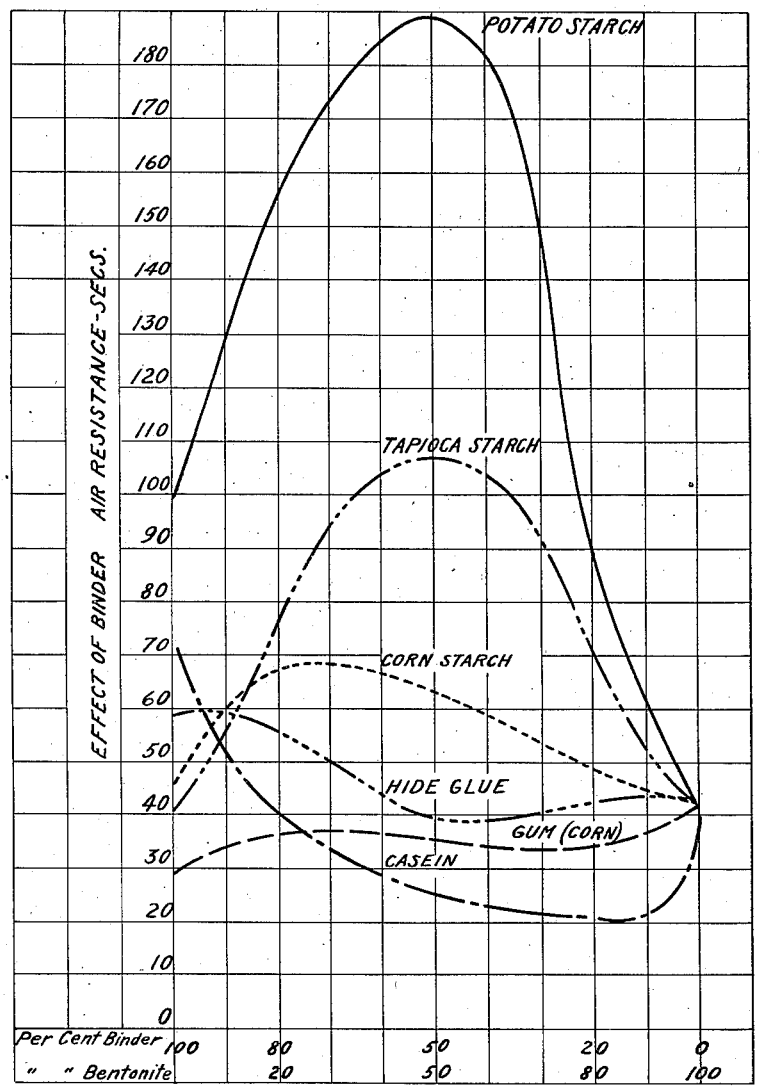
Fig. 3 shows the sealing effect of bentonite in combination with various starches in contrast to other so-called binders such as hide glue, casein, and a special vegetable adhesive or gum made from cornstarch, in terms of the Gurley Densometer test.
Figure 4:
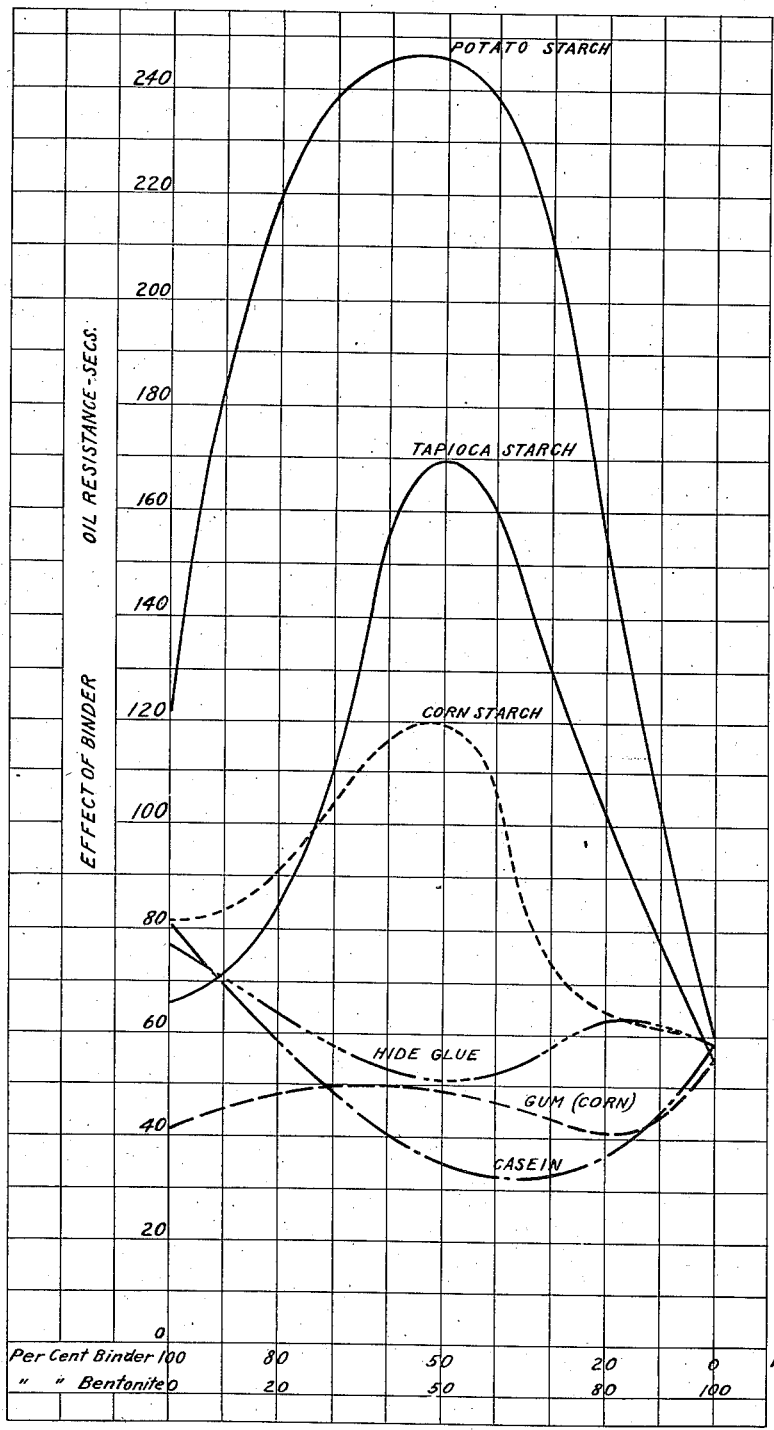
Fig. 4 shows results analogous to those of Fig. 3 in terms of the oil penetration test.

Referring to Figs. 3 and 4, the filler is bentonite only and the binders vary. In Fig. 3 the ordinates show the Gurley values and in Fig. 4 the ordinates show the oil penetration values. In both Figs. 3 and 4 the abscissae show the ratio in parts by weight of the bentonite to the binder. Figs. 3 and 4 show the sealing effect of bentonite in combination with various starches in contrast to binders other than starches. The starches are potato starch, tapioca starch and cornstarch, and the other binders are hide glue, a special gum prepared from cornstarch, and casein. It will be clear from Figs. 3 and 4 that the relationship between bentonite and the various starches in respect of the sealing effect of the respective compositions is of a nature quite different from the relationship between bentonite and the other binders shown.

The specific manner in which the data on which is based Figs. 1 and 2 was obtained is as follows:

The base paper was a 60 pound kraft paper such as is used for making gumming paper. For priming or sizing the paper in accordance with this invention, a quantity of starch was suspended in a calculated amount of water and cooked by heating at 170° F. for sufficient time to allow the starch particles to swell and burst. To this starch solution was added the requisite quantity of the filler to give the desired ratio or proportion of starch to filler. Experiments were made using 100 percent starch, 100 percent filler, and ratios of starch to filler of 80–20, 75–25, 50–50, 25–75 and 20–80. A concentration of total solids was employed to give the desired wet pick-up. Sheets of the base kraft paper were dipped in the respective baths and passed between squeeze rolls with the pressure on the rolls adjusted to give such an increase in weight, based on the weight of the original dry sheet, that the accumulated solids in the sheet after drying would be 3 percent. The wet impregnated sheets from the squeeze rolls were dried on a heated drum to normal dryness, as is customary in the paper industry. The sheets were then humidified for at least two hours in a room maintained at 45 percent relative humidity and 70° F. Specimens from these sheets were then submitted to the standard Gurley test and also to the oil penetration test.

The data on which Figs. 3 and 4 are based was obtained in the same manner except that the binder was varied, the filler in all cases being the same, that is, bentonite.

It will be clear from an examination of Figs. 1 and 4 that, first, as shown in Figs. 1 and 2, among the various fillers in relation to starch, bentonite has a unique and surprising relation, and secondly, referring to Figs. 3 and 4, among the various binders the starches have a unique relationship to bentonite. It will furthermore be apparent that the unique sealing effect of starch-bentonite compositions is particularly marked within certain ratios of starch to bentonite. The maximum sealing effect is obtained when the ratios are about 50–50, although the effect is also marked within wider ranges, as for example from about 20 to 80 percent of bentonite by weight based upon the starch-bentonite composition.

The following specific examples will be given in order to provide in detail certain typical or illustrative embodiments of the principles of the invention. These principles will be defined in the claim ultimately appended hereto, the examples being provided for the purpose of illustration rather than limitation:

Example 1

A 60 pound kraft paper, engine sized with 2 percent rosin based on weight of fiber and beaten substantially less than usual, as measured with a Freeness tester, for the production of a gumming sheet of a given weight, was run through a size-tub containing an aqueous suspension of 2¼ percent bentonite and 2¼ percent cooked tapioca starch and was then squeezed at the size-press, re-dried and calendered in the usual way. The paper, after being passed through the size-tub and re-dried, was found to have increased in weight, on a bone-dry basis, about 3 percent. At this point the paper was found to be substantially unimpaired in tear-resistance and flexibility in comparison with the unprimed sheet. The calendered sheet was then coated with a hide glue solution, as in the conventional production of a gumming paper. It was found that the penetration of the glue coating into the subjacent base was minimized by the starch-bentonite primer and that the proportion of glue to paper was greatly reduced over that required in conventional practice hereinafter described.

A conventional practice which may be employed for comparison with the above example differs from the procedure therein set forth in that the pulp is normally hydrated to a substantially greater extent and starch alone is used in the size-tub at a concentration of about 5 percent. When the resulting paper is surfaced with a glue coating it is found that there is marked penetration of the coating into the body of the paper and that relatively large proportions of glue are necessary to attain the desired result, despite the fact that the conventional sheet is more highly beaten in an attempt to minimize this penetration.

Since a high degree of beating tends to cause paper to cockle and curl during the drying operation, especially on high-speed machines, the improved priming composition hereof, by permitting a reduction in the degree of beating, substantially eliminates this disadvantage.

Example 2

A 35 pound sheet of bleached kraft pulp, engine sized with 1½ percent rosin, was surface primed with an aqueous suspension containing 1¾ percent of bentonite and 2½ percent cooked potato starch, based on total weight of the aqueous suspension, and was then squeezed by passage through a size-press, re-dried and calendered. The sheet increased in weight, on a dry basis, about 3 percent by passage through the bentonite-starch suspension. At this point it was found to be of substantially the same tear-resistance and flex-endurance as the sheet before surface priming.

The sheet thus surface primed was then coated with a solution of rubbery polymer (Pliolite) in carbon tetrachloride. It was found that relatively small quantities of Pliolite, of the order of 2 or 3 grams per square yard, were sufficient to impart a remarkable moisture-resistance to the sheet, inasmuch as the Pliolite was confined practically entirely to the surface of the paper.

When a sheet of paper similar in all respects except that it was surface primed by passage through a solution of 4 to 5 percent potato starch alone, was similarly coated with Pliolite, it was found that despite the fact that the Pliolite was absorbed by the sheet to an appreciably greater extent, the moisture imperviousness of the final product was markedly inferior.

Example 3

A pressed pulp milk bottle manufactured in the usual way from a furnish comprised largely of ground wood pulp, was filled with an aqueous suspension containing approximately 1½ percent of bentonite and 2½ percent cooked potato starch. The suspension was quickly poured from the bottle, which was allowed to stand in an inverted state in order to permit the excess to drain off. The bottle thus treated was then dried by passage through an oven provided with a stream of heated air. To the bottle, while still warm, was added molten paraffin and the excess poured out and the bottle permitted to drain. It was found that the paraffin coating was confined substantially to the surface. Similar tests made on a fiber bottle, untreated or treated with starch alone, showed that such large quantities of paraffin were absorbed as to make the internal coating of the bottle with paraffin impractical for economic and other reasons.

This application is a continuation-in-part of my copending application Serial No. 263,664, filed March 23, 1939.

I claim:

A coated paper product comprising a flexure-durable and tear-resistant paper stock, a surface primer, said primer being a starch-bentonite composition, the proportion by weight of said primer composition to the weight of the paper stock being from about 0.5 to 5.0 percent by weight and the proportion of bentonite to starch plus bentonite in said surface primer composition being within the range of about 20 to 80 percent by weight, and a coating, superimposed on said surface primer, of a film-forming substance, the combined weight of the primer and coating in relation to the weight of said paper stock being insufficient to seriously impair its flex-enduring and tear-resisting qualities.

MILTON O. SCHUR.